United States Patent
Kraus et al.

(10) Patent No.: US 7,487,868 B2
(45) Date of Patent: Feb. 10, 2009

(54) VIBRATORY CONVEYOR DECK WITH ADJUSTABLE CURVATURE

(75) Inventors: Richard B. Kraus, Barrington, IL (US); Kurt Christopherson, South Elgin, IL (US); Robert Markowski, McHenry, IL (US)

(73) Assignee: General Kinematics Corporation, Crystal Lake, IL (US)

( * ) Notice: Subject to any disclaimer, the term of this patent is extended or adjusted under 35 U.S.C. 154(b) by 0 days.

(21) Appl. No.: 11/010,169

(22) Filed: Dec. 10, 2004

(65) Prior Publication Data

US 2005/0133343 A1    Jun. 23, 2005

Related U.S. Application Data

(60) Provisional application No. 60/532,327, filed on Dec. 23, 2003.

(51) Int. Cl.
| | |
|---|---|
| B65G 13/02 | (2006.01) |
| B65G 21/18 | (2006.01) |
| B65G 15/08 | (2006.01) |
| B65G 39/10 | (2006.01) |
| B65G 35/00 | (2006.01) |
| B65G 27/02 | (2006.01) |

(52) U.S. Cl. .................. 198/778; 198/826; 198/630; 198/757

(58) Field of Classification Search .............. 198/766, 198/756, 630, 826, 757, 860.1, 778
See application file for complete search history.

(56) References Cited

U.S. PATENT DOCUMENTS

| | | | |
|---|---|---|---|
| 2,688,394 A | * | 9/1954 | Hurd et al. ................. 198/816 |
| 2,927,683 A | | 3/1960 | Carrier, Jr. |
| 3,087,602 A | | 4/1963 | Hinkle, Jr. |
| 3,583,246 A | * | 6/1971 | Stahle et al. .................. 74/61 |
| 3,664,487 A | | 5/1972 | Ballenger |
| 3,712,459 A | | 1/1973 | Musschoot et al. |
| 3,776,352 A | | 12/1973 | Musschoot |
| 3,789,977 A | * | 2/1974 | Musschoot .................. 198/756 |
| 3,848,343 A | | 11/1974 | Musschoot |

(Continued)

FOREIGN PATENT DOCUMENTS

DE        4106712        6/1992

(Continued)

OTHER PUBLICATIONS

European Search Report for European Application No. 04029671.7, dated Apr. 1, 2005, 4 pages.

*Primary Examiner*—Gene Crawford
*Assistant Examiner*—Ramya G Prakasam
(74) *Attorney, Agent, or Firm*—Marshall, Gerstein & Borun LLP

(57) ABSTRACT

A vibratory conveyor for transporting an object has a first housing wall with a first wall support and a second housing wall with a second wall support. A deck has a first lateral edge engaging the first wall support and a second lateral edge engaging the second wall support, so that the deck extends along a deck path and defines a conveyor surface adapted to receive the object. A force assembly is mechanically coupled to the deck and applies a force that bends the deck into an arcuate cross-sectional profile.

10 Claims, 6 Drawing Sheets

U.S. PATENT DOCUMENTS

| | | | |
|---|---|---|---|
| 3,850,288 | A | 11/1974 | Musschoot |
| 4,140,215 | A | 2/1979 | Musschoot |
| 4,181,216 | A | 1/1980 | Cipu |
| 4,267,919 | A | 5/1981 | Schrader |
| 4,482,046 | A | 11/1984 | Kraus |
| 4,611,709 | A | 9/1986 | Kraus et al. |
| 4,709,507 | A | 12/1987 | Musschoot |
| 4,775,284 | A | 10/1988 | Musschoot |
| 4,787,502 | A | 11/1988 | Sullivan et al. |
| 4,787,504 | A * | 11/1988 | Schultz .................. 198/782 |
| 4,844,236 | A | 7/1989 | Kraus |
| 4,875,343 | A | 10/1989 | Jeppsson |
| 4,926,601 | A | 5/1990 | Musschoot |
| 4,953,365 | A | 9/1990 | Lang et al. |
| 5,007,528 | A * | 4/1991 | Hideharu .................. 198/823 |
| 5,024,320 | A | 6/1991 | Musschoot |
| 5,054,606 | A | 10/1991 | Musschoot |
| 5,178,259 | A | 1/1993 | Musschoot |
| 5,375,694 | A | 12/1994 | Sanford et al. |
| 5,413,213 | A | 5/1995 | Golz et al. |
| 5,713,457 | A | 2/1998 | Musschoot |
| 5,931,286 | A | 8/1999 | Illi |
| 5,934,446 | A | 8/1999 | Thomson |
| 6,029,796 | A | 2/2000 | Musschoot |
| 6,112,883 | A | 9/2000 | Kraus et al. |
| 6,155,404 | A | 12/2000 | Musschoot |
| 6,659,267 | B2 * | 12/2003 | Patterson .................. 198/771 |
| 6,827,201 | B1 | 12/2004 | Markowski et al. |
| 6,948,611 | B2 | 9/2005 | Dumbaugh |
| 7,037,048 | B2 | 5/2006 | Markowski et al. |
| 7,296,951 | B2 | 11/2007 | Kraus et al. |
| 2006/0147277 | A1 | 7/2006 | Kraus et al. |

FOREIGN PATENT DOCUMENTS

| | | |
|---|---|---|
| DE | 4228543 | 11/1993 |
| GB | 2235756 | 3/1991 |
| JP | 10-339571 | 12/1998 |

* cited by examiner

VIBRATORY CONVEYOR DECK WITH ADJUSTABLE CURVATURE

CROSS-REFERENCE TO RELATED APPLICATION

This application claims the benefit of U.S. Provisional Application No. 60/532,327, filed Dec. 23, 2003.

FIELD OF THE DISCLOSURE

This disclosure generally relates to vibratory process equipment and, more particularly, to decks used in vibratory conveyors.

BACKGROUND OF THE DISCLOSURE

Vibratory conveyors are generally known in the art for transporting objects using a vibratory force. Such conveyors typically include a deck or other structure that has a conveying surface which defines a path along which objects are conveyed. Depending on the application, the path defined by the deck may be straight, curved, inclined, declined, spiral, or other configuration.

The deck is typically constructed of plate steel. As a result, when viewed in cross-section, the conveying surface defined by the deck is typically "flat" across the width of the deck. Stated alternatively, the conveying surface is substantially linear across its width.

While a flat deck is satisfactory for many applications, it may cause unintended and undesirable results when used to convey certain objects. For example, when conveying generally cylindrical objects such as cam shafts along a flat deck, the objects may roll transversely across the width of the deck, and therefore are not located on the deck with any degree of certainty. In addition, the cylindrical objects may become oriented transversely across the deck, and therefore more easily roll into and possibly damage other objects on the deck.

Flat decks are also difficult to employ for certain path configurations. In a spiral conveyor, for example, it is preferable to form the deck in a helicoid shape. To approximate the helicoid shape with flat plate steel, several bends such as cross crimps are typically formed in the deck. Such cross crimps, however, create abrupt changes in the pitch of the deck and cause the conveying surface to be non-linear across its width. Consequently, the cross-crimps create localized high wear area and non-uniform stresses in the deck. These problems are exacerbated during thermal expansion and contraction, which can be significant when the spiral conveyor is used for heating or cooling of the objects being conveyed. In addition, the need for cross crimps or other bends in the deck increases manufacturing costs and makes assembly more difficult, especially for conveyors that are constructed as multiple sub-assemblies that are mated together, such as for large conveyor sizes.

DETAILED DESCRIPTION

A conveyor deck is disclosed herein having a conveying surface and a back surface. A rib is attached to the back surface and a "force assembly" is coupled to the rib. By applying a force to the rib with the force assembly, the deck may be bowed either concavely or convexly. If formed with a concave bend, the conveying surface of the deck, when viewed in cross-section, will have a localized low point adjacent the rib that defines a deck along which objects are conveyed. The concave shape also tends to orient cylindrical objects longitudinally on the deck, defined herein as parallel to the direction of travel. Additionally, when used in a spiral conveyor, the bowed cross-sectional shape allows the deck to be formed more nearly to a pure helicoid, where the pitch of the deck is consistent along the entire conveyor path and each radial cross section of the deck will have linear opposing deck edges, regardless of whether the deck is curved concavely or convexly. While the disclosed embodiment is a spiral conveyor, it will be appreciated that the bowed deck shape provides advantages for other conveyor path configurations, including linear, curved, and inclined paths.

Figure 1:
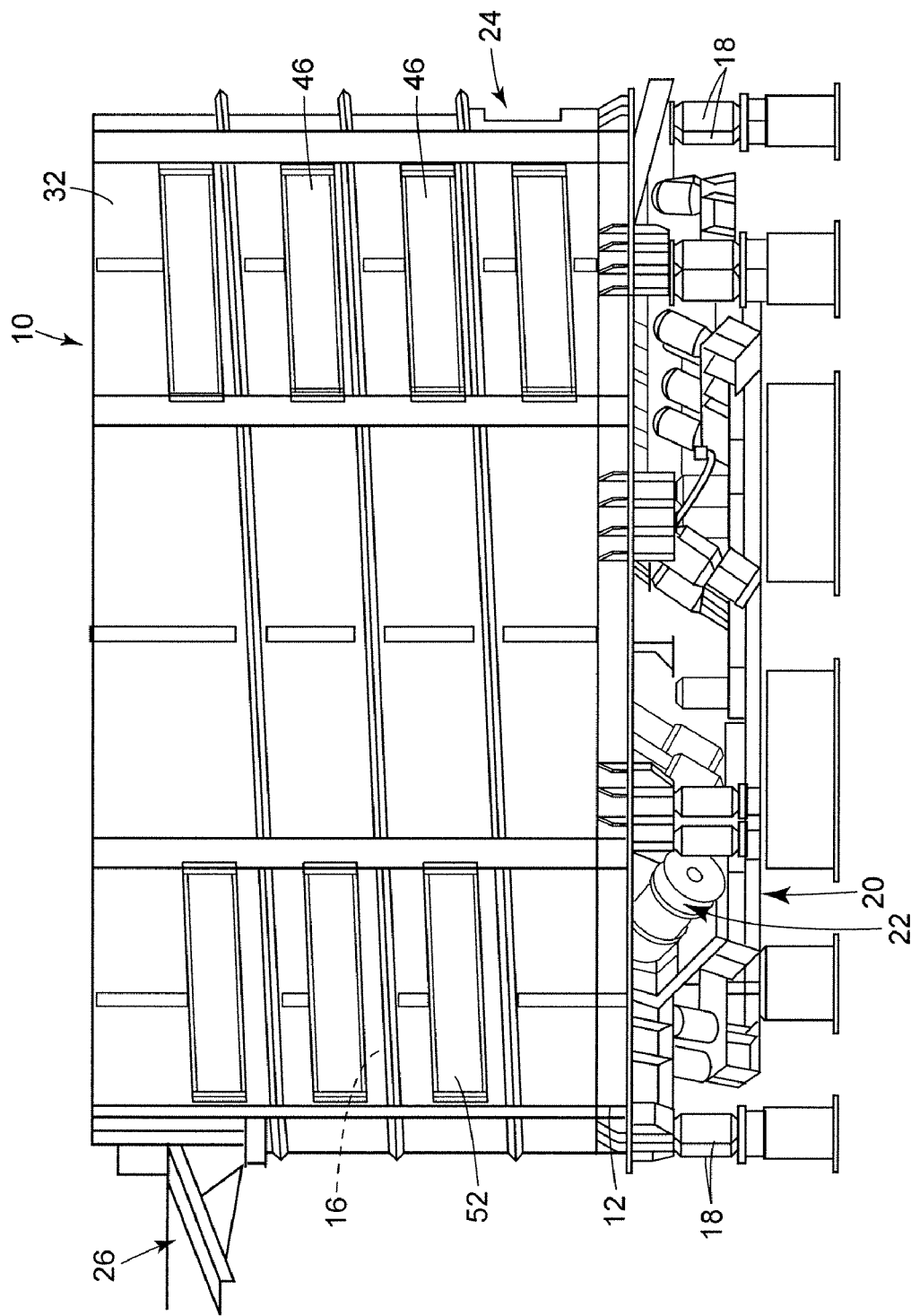
FIG. 1 is a side elevation view of a vibratory spiral conveyor constructed in accordance with the teachings of the present disclosure.
Figure 2:
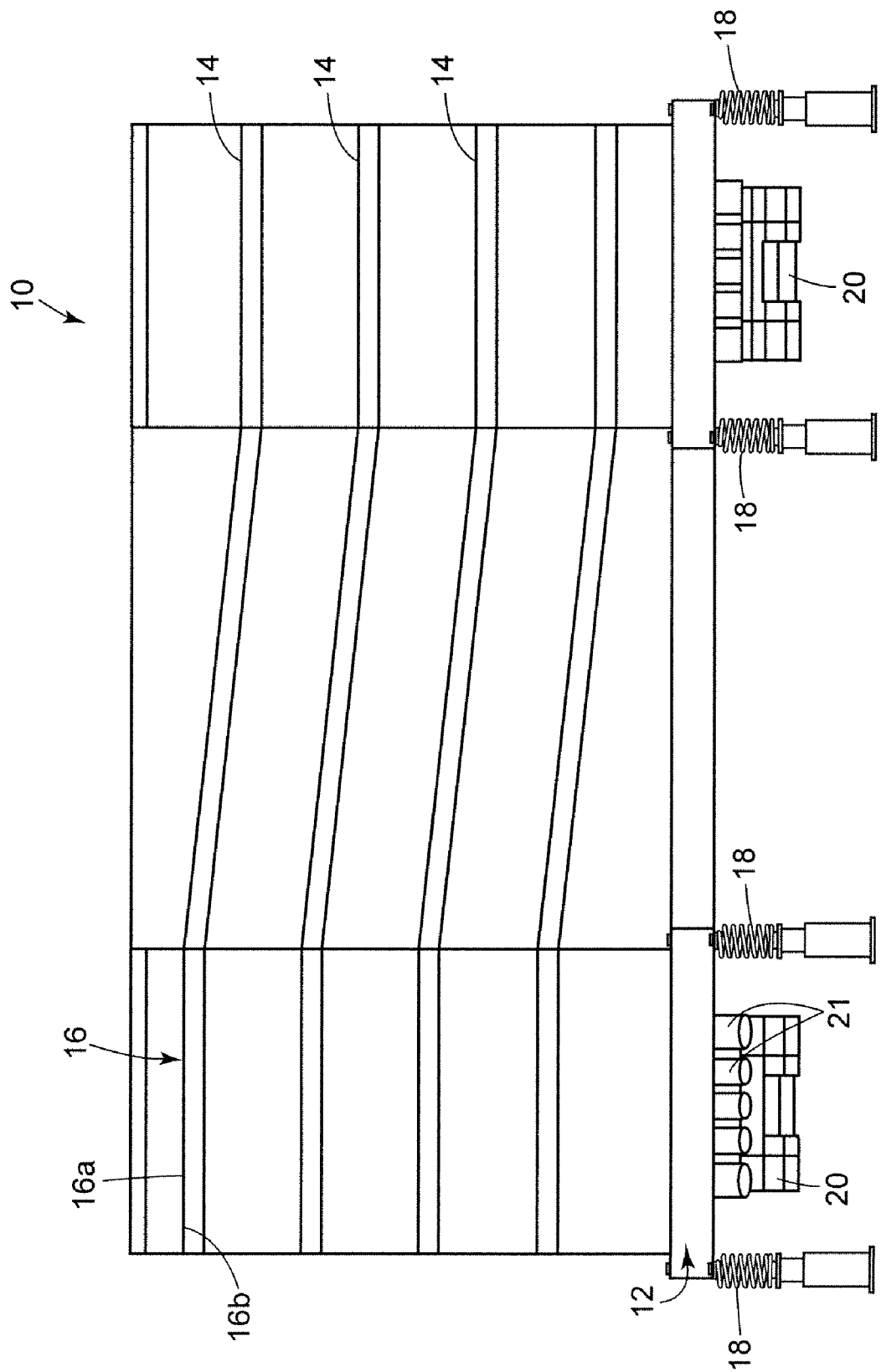
FIG. 2 is an enlarged, partially schematic, sectional side view of the conveyor of FIG. 1.
Figure 3:
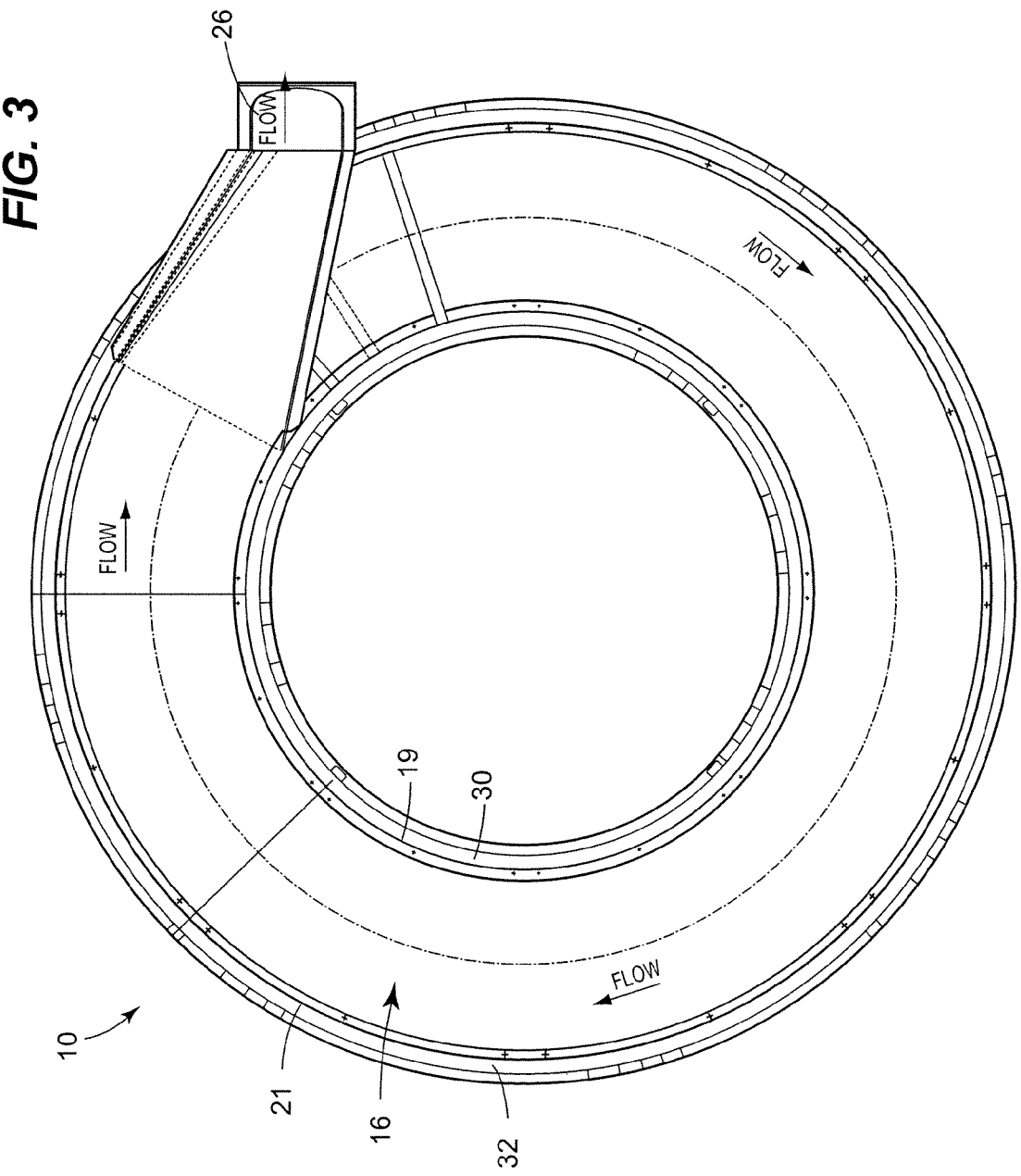
FIG. 3 is a plan view of the conveyor of FIG. 1.

Referring to FIGS. 1 and 2, a spiral conveyor 10 is shown having a frame 12 supporting a spiral deck 16. The frame 12 is resiliently supported above the ground or mounting surface by isolation means, such as springs 18. An exciter mass 20 and vibration generators 22 are resiliently coupled to the frame 12, such as by springs 21 (FIG. 2). Any generally known vibration generators may be used, such as motors having rotating shafts carrying eccentric weights.

Figure 4:
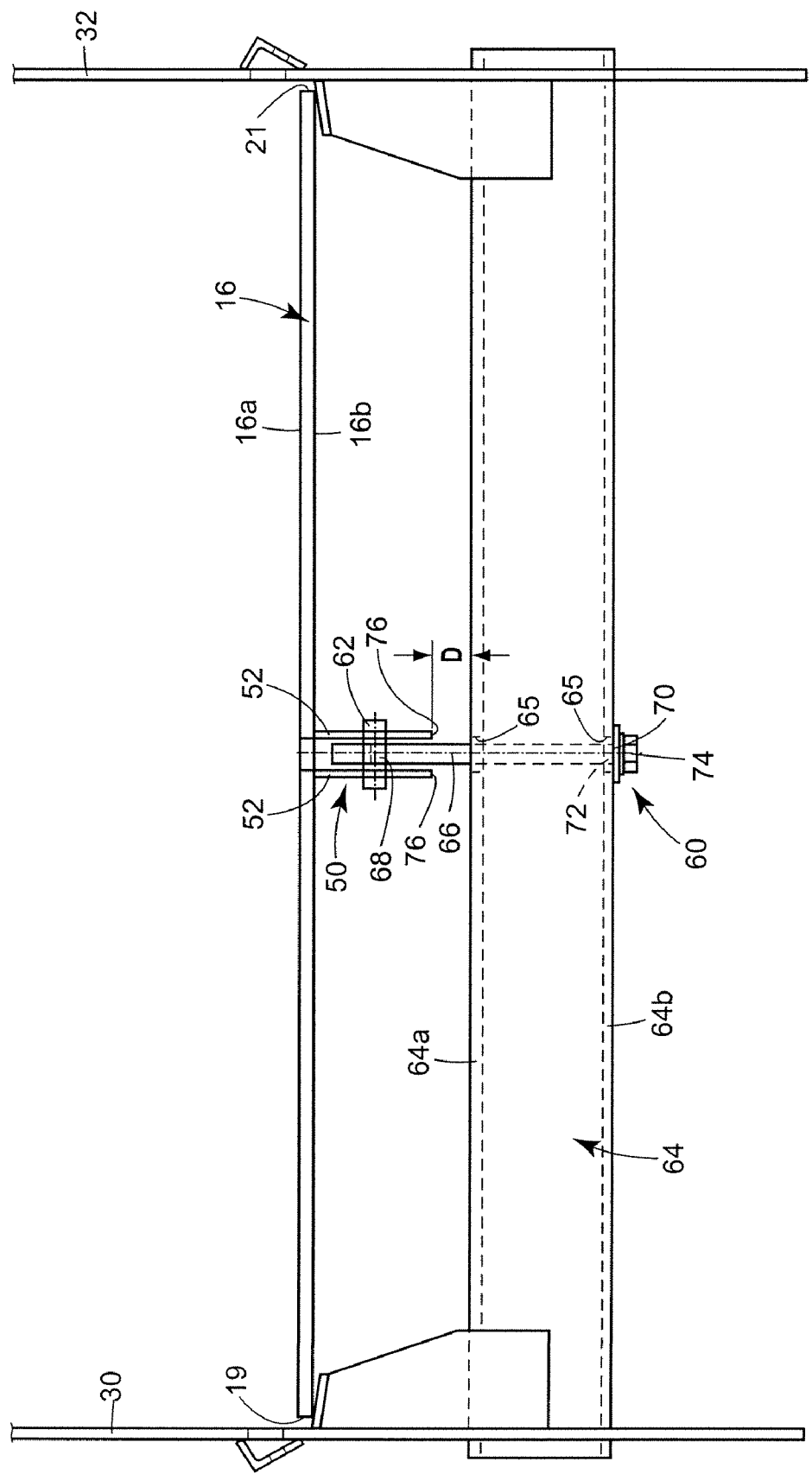
FIG. 4 is an enlarged sectional side view of a portion of the conveyor deck before the bending force is applied to the deck.
Figure 5:
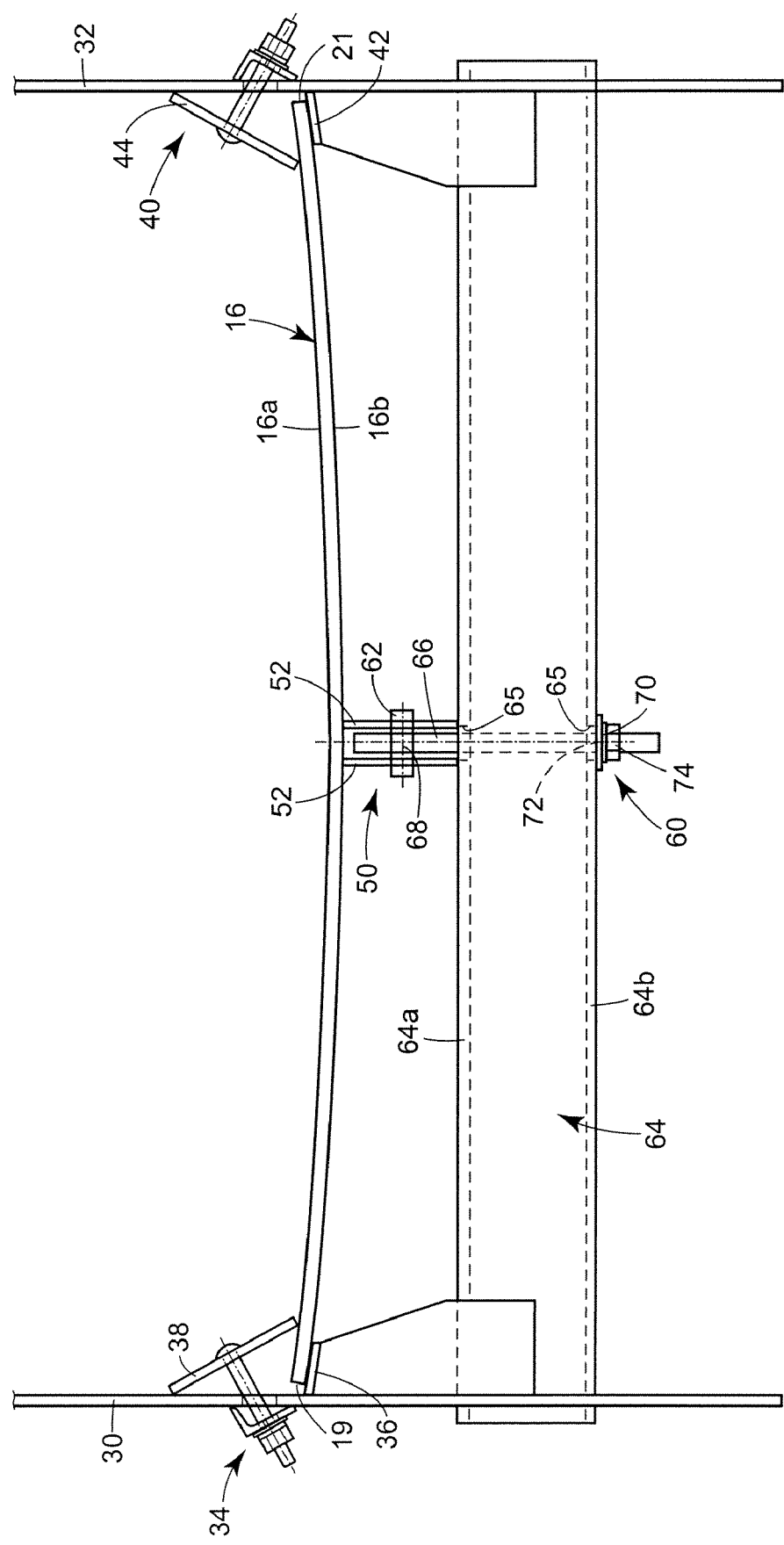
FIG. 5 is an enlarged sectional side view of a portion of the conveyor deck with a bending force applied to the deck.

In the illustrated embodiment, the spiral deck 16 is oriented to vertically elevate work pieces, such as hot castings, from an inlet 24 to an outlet 26. The deck 16 defines a conveying surface 16a for receiving the work pieces and a back surface 16b (FIGS. 4 & 5). The work pieces may be transferred from an origination point, such as a molding line, to the inlet 24 by any conveying means, such as by a linear vibratory or other type of conveyor (not shown). The spiral deck 16 is formed in a helical pattern so that, as the work pieces move circumferentially around the deck, they are also elevated in the vertical direction. When the conveyor 10 is viewed in elevational cross-section, as schematically shown in FIG. 2, the spiral deck 16 defines a plurality of stacked tier segments 14. At the outlet 26, the work piece may be deposited onto an outlet transport (not shown), which may also be a conveyor. While the conveyor 10 is described herein as conveying the work pieces vertically upward, the inlet and outlet may be reversed so that the work pieces are conveyed vertically downward along the spiral deck 16.

The vibration generators 22 may be controlled in any known fashion to produce the desired vibrational motion of the frame 12 and coupled spiral deck 16, thereby to advance the work pieces along the deck 16. For example, the motors may be rotated in opposite directions (i.e., counter-rotated) and controlled to maintain a desired phase angle between the eccentric weights. While the illustrated embodiment is a two mass system, it will be appreciated that the conveyor 10 may be provided as a single mass or brute force system.

As best shown with reference to FIGS. 3-6, the spiral deck 16 includes an inner edge 19 and an outer edge 21. An inner housing wall 30 is coupled to the spiral deck inner edge 19 and an outer housing wall 32 is coupled to the spiral deck outer edge 21. More specifically, the deck inner edge 19 is secured to the inner housing wall 30 by a first or inner wall support assembly 34, which may clamp the deck inner edge 19 between a bottom flange 36 and a top retainer 38 (FIG. 5). Similarly, the deck outer edge 21 may be secured to the outer housing wall 32 by a second or outer wall support assembly 40, which may clamp the deck outer edge 21 between a bottom flange 42 and a top retainer 44. A plurality of access doors 46 (FIG. 1) may be formed in the housing outer wall 32 for accessing the different tier portions 14 of the deck 16, should the outer housing wall 32 completely enclose the deck 16.

Figure 6:
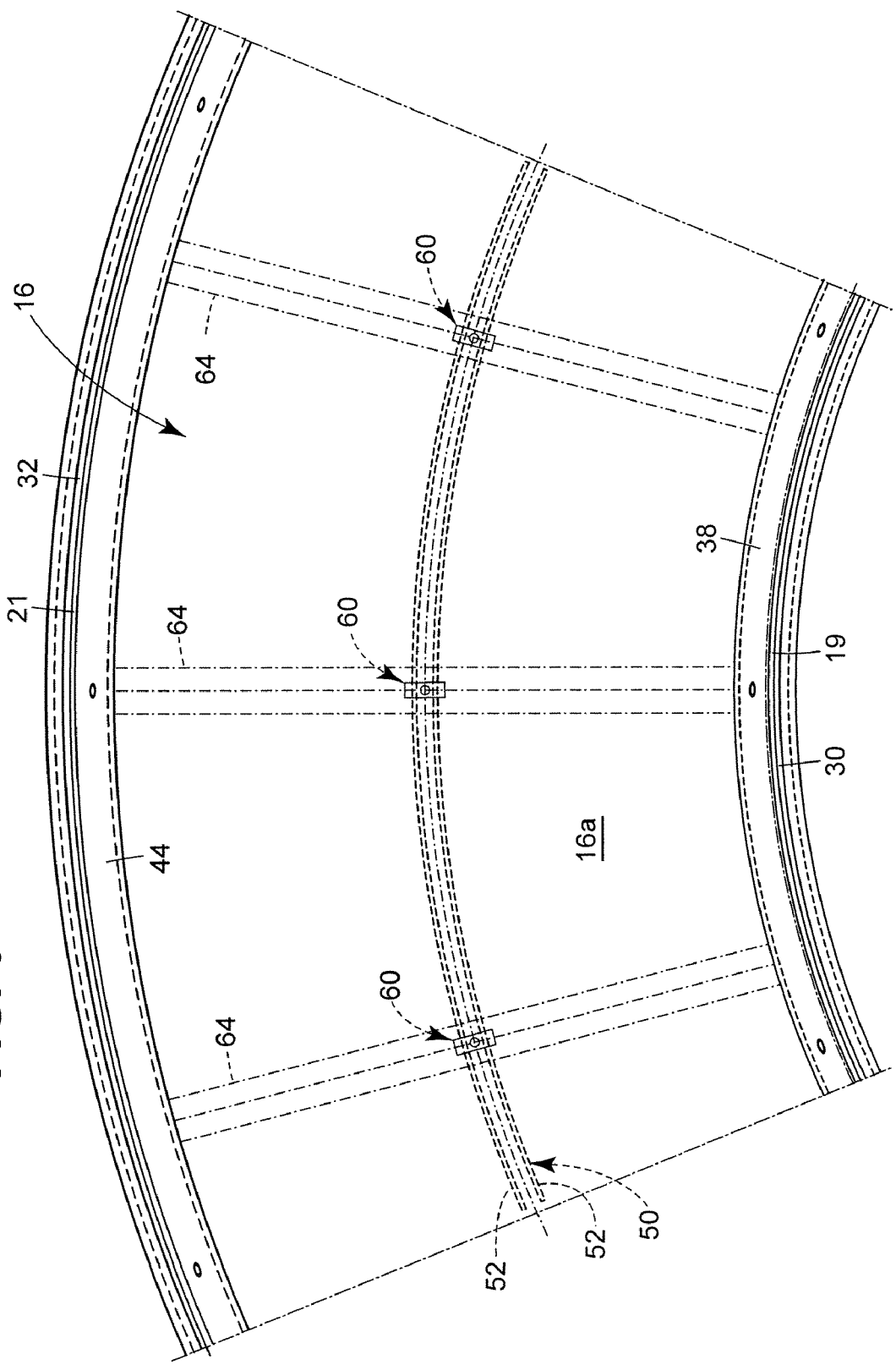
FIG. 6 is a plan view of a section of the deck.

A rib assembly 50 is attached to the deck back surface 16b between the inner and outer deck edges 19, 21 (FIGS. 4-6). The rib assembly may 50 may extend continuously along the deck 16 in the longitudinal direction, so that, in the illustrated embodiment, the rib assembly has a spiral shape. The rib assembly 50 may include a pair of ribs 52 having aligned transverse apertures.

A force assembly 60 coupled to the rib assembly 50 to create a force that bends the deck 16 into an arcuate shape when viewed in cross-section. The exemplary force assembly 60 includes a pin 62 mechanically coupled to the rib assembly 50, such as by insertion through the transverse apertures formed in the ribs 52. A cross support 64 is spaced from the deck 16 and supported by the inner and outer housing walls 30, 32. As shown, the cross support 64 is provided as a tubular steel member, and has apertures 65 formed in the upper and lower support surfaces 64a, 64b. A link 66 is inserted through the apertures in the cross support 64 and defines a first end 68 coupled to the pin 62 and a second end 70. The link 66 also includes a threaded portion 72 for receiving a nut 74.

The nut 74 may be adjusted on the link threaded portion 72 to generate a force in the link 66 that is transferred by the rib assembly 50 to the deck 16, thereby to bend the deck 16 in an arcuate shape. As shown in FIGS. 4 & 5, the nut 74 may be located below the cross support 64. In FIG. 4, the deck 16 is shown in a relaxed state, where the force assembly 60 applies no force to the deck 16. The nut 74 may be adjusted upwardly along the threaded portion 72 so that the nut engages the lower surface of the cross support 64, thereby to create tension in the link 66. The tension in the link 66 is transferred by the pin 62 as a downwardly directed force acting against the rib assembly 50 and attached deck 16. The nut 74 may be adjusted along the threaded portion 72 to create a tension force in the link 66 sufficient to bend the deck 16 into an arcuate shape, as shown in FIG. 5.

In an alternative embodiment, the pin 62 may be provided as a bar coupled to the ribs 52 and formed with a threaded aperture. The link 66 may be a bolt or threaded rod with the first end 68 threadably engaging the bar threaded aperture. The second end 70 of the bolt is a bolt head, which takes the place of the nut 74. Accordingly, bolt may be threaded into the bar threaded aperture to create the tension force.

The ribs 52 may project sufficiently past the pin 62 to define stop ends 76 that are engageable with the top surface 64a of the cross support, thereby to limit the amount of deflection of the deck 16. As shown in FIG. 4, when the deck 16 is in the relaxed state, the rib stop ends 76 are spaced from the top surface of the cross support by a known distance "D". As the nut 74 is tightened to deflect the deck 16, the stop ends 76 are drawn toward and eventually engage the cross support top surface 64a, thereby limiting the amount of deflection of the deck 16.

While the illustrated embodiment shows the deck conveying surface 16a bent into a concave arcuate shape, the conveying surface may also be formed with a convex arcuate shape. To do so, the force assembly 60 may be modified so that the link threaded portion 72 is adjacent an upper surface of the cross support 64, and the nut 74 may be adjusted downwardly along the threaded portion to engage the upper surface 64a of the cross support. Consequently, a compression force is generated in the link 66 that is transferred by the pin 62 as an upwardly directed force against the rib assembly 50 and attached deck 16.

To create the compression force in the alternative embodiment described above, a nut may simply be provided on the bolt above the cross support upper surface 64a, and the nut may be adjusted downwardly along the bolt to engage the upper surface 64a.

While only a single force assembly 60 is shown coupled to the rib assembly 50 in FIGS. 4 & 5, it will be appreciated that a plurality of force assemblies 60 may be coupled to the rib assembly 50 at points spaced along the longitudinal length of the rib assembly 50. In the segment of the deck 16 shown in FIG. 6, a total of three force assemblies 60 are shown coupled to the rib assembly 50. FIG. 6 also illustrates the ribs 52 extending along the longitudinal length of the deck 16. Furthermore, while a single deck segment is shown in FIG. 6, it will be appreciated that multiple deck segments may be fabricated independently and assembled to create the complete conveyor deck. The improved fit of the arcuate shaped deck allows the ends of the deck segments to be more reliably located, thereby facilitating assembly of mating deck segments.

While a spiral conveyor path has been described and illustrated, the present disclosure is applicable to other conveyor path configurations requiring different deck shapes, such as linear, inclined, or curved decks, while still providing some or all of the benefits described herein. Still further, multiple concentric (in the case of curved or spiral path configurations) or parallel (in the case of linear path configurations) rib assemblies may be attached to the deck 16 or adjacent sub-decks, each of which having force assemblies coupled thereto, so that the deck is bent with multiple arcs defining multiple lanes for transporting a column of objects.

Although certain apparatus constructed in accordance with the teachings of the invention have been described herein, the scope of coverage of this patent is not limited thereto. On the contrary, this patent covers all embodiments of the teachings of the disclosure fairly falling within the scope of the appended claims either literally or under the doctrine of equivalents.

What is claimed is:

1. A vibratory conveyor for transporting an object, the conveyor comprising:

a first housing wall having a first wall surface with a first wall support coupled thereto;

a second housing wall having a second wall surface with a second wall support coupled thereto, the spacing between the first wall surface and the second wall surface being fixed;

a flat metal deck disposed between the first and second housing walls and having a first lateral edge slidably engaging the first wall support and a second lateral edge slidably engaging the second wall support, the metal deck being suspended between the first wall support and the second wall support, the deck extending along a deck path and defining a conveyor surface adapted to receive the object, the deck being bounded along the deck path at the first and second lateral edges by the first and second wall surfaces;

an adjustable force assembly mechanically coupled to deck, the force assembly applying a force that bends the deck into an adjustable arcuate cross-sectional profile; and a vibration generator coupled to the deck, the vibration generator producing vibrational motion of the deck as the primary conveying mechanism to thereby advance the object therealong.

2. The conveyor of claim 1, in which the deck includes a rib, in which the force assembly is mechanically coupled to the rib.

3. The conveyor of claim 2, in which the force assembly comprises a pin coupled to the rib, a cross support spaced from the deck and defining an aperture, a link inserted through the cross support aperture having a first end coupled to the pin and a threaded portion, and a nut threadably engaged with the link threaded portion, wherein the nut is adjusted along the threaded portion to create the force.

4. The conveyor of claim 3, in which the nut is adjusted to create a resultant tension force in the link.

5. The conveyor of claim 4, in which the force bends the deck so that the conveying surface has a concave arcuate profile.

6. The conveyor of claim 3, in which the rib projects past the pin to define a stop end, wherein the stop end engages the cross-support to limit deflection of the deck.

7. The conveyor of claim 2, in which the rib extends longitudinally along the deck path.

8. The conveyor of claim 7, in which a plurality of force assemblies is coupled to the rib at points spaced along the rib.

9. The conveyor of claim 1, in which each of the first and second wall supports comprises a bottom flange and a top retainer that have spaced ends which clamp one of the first lateral edge or the second lateral edge in a space therebetween.

10. The conveyor of claim 1, in which the deck path has a spiral configuration and the conveying surface is formed as a helicoid.

* * * * *